United States Patent [19]
Hashimoto

[11] Patent Number: 5,467,329
[45] Date of Patent: Nov. 14, 1995

[54] OPTICAL DISC PLAYBACK APPARATUS AND METHOD WHICH UTILIZES SINGLE RAM FOR DATA DECODING AND TOC PROCESSING

[75] Inventor: Minoru Hashimoto, Kanagawa, Japan

[73] Assignee: Sony Corporation, Tokyo, Japan

[21] Appl. No.: 150,384

[22] Filed: Nov. 9, 1993

[30] Foreign Application Priority Data

Nov. 13, 1992 [JP] Japan ................... 4-328739

[51] Int. Cl.[6] .................................................. G11B 7/00
[52] U.S. Cl. ........................ 369/48; 369/32; 369/54; 369/58
[58] Field of Search ........................ 369/47, 48, 32, 369/124, 49, 33, 34, 54, 58; 360/19.1; 358/342

[56] References Cited

U.S. PATENT DOCUMENTS

| | | | |
|---|---|---|---|
| 4,758,902 | 7/1988 | Okamoto et al. | 360/18 |
| 4,833,548 | 5/1989 | Watanabe | 358/342 X |
| 5,222,054 | 6/1993 | Muraoka et al. | 369/32 |
| 5,243,582 | 9/1993 | Yamauchi et al. | 369/48 X |

Primary Examiner—W. R. Young
Assistant Examiner—Thang V. Tran
Attorney, Agent, or Firm—Limbach & Limbach; Philip M. Shaw, Jr.

[57] ABSTRACT

An optical disc playback apparatus for playing back information such as music recorded on a compact disc (CD) and/or information such as data recorded on compact disc read only memory (CD-ROM) comprises: device for reading the information from the CD or the CD-ROM; device for decoding the CD-ROM data from the reading device; device for processing TOC information from the reading device; memory for storing CD TOC information when the CD is played back, and data to be used for decoding the information recorded on the CD-ROM when the CD-ROM is played back; and device for changing over between using the memory for storing the TOC information or using the memory as a data decoder for the CD-ROM.

9 Claims, 2 Drawing Sheets

1

OPTICAL DISC PLAYBACK APPARATUS AND METHOD WHICH UTILIZES SINGLE RAM FOR DATA DECODING AND TOC PROCESSING

BACKGROUND OF THE INVENTION

1. Field of the Invention:

The present invention relates to an optical disc playback method and apparatus capable of playing back from, for example, music Compact Discs (CD's) and Compact Disc Read Only Memory (CD-ROM).

2. Description of the Related Art:

In optical disc playback apparatus such as CD-ROM playback equipment which is capable of playing back, for example, music CD's, information is stored in a Table of Contents (TOC). This TOC will have a storage capacity of, for example, 396 bytes, so as to be capable of storing 99 XXX×4 bytes (control, minutes, seconds frames).

However, a single chip microcomputer with a built in RAM does not have a sufficient storage capacity to achieve this. For this reason, a RAM dedicated to use with the microcomputer was set up outside the microcomputer in CD-ROM playback equipment for the prior art. This meant that costs could not be reduced and that the number of assembling steps increased. A separate RAM could also be installed for decoding the data from the CD-ROM, but this is wasteful as this is RAM is not needed when playing back music from a CD.

SUMMARY OF THE INVENTION

As the present invention sets out to solve the problems described by providing an optical disc playback apparatus and method which do not require an external RAM dedicated to use with a microcomputer, which provide cost reductions, and with which the number of assembling steps is reduced.

The optical disc playback apparatus for the present invention is therefore capable of playing back information such as music recorded on a compact disc (CD) and/or information such as data recorded on compact disc read only memory (CD-ROM) and comprises means for reading the information from the CD or the CD-ROM, means for decoding the CD-ROM data from the reading means, means for processing TOC information from the reading means, means for storing CD TOC information when the CD is played back, and data to be used for decoding the information recorded on the CD-ROM when the CD-ROM is played back, and means for changing over between using the storing means for storing the TOC information or using the storing means as a data decoder for the CD-ROM.

The storage means may also be a random access memory (RAM).

Also, an optical disc playback method for playing back information such as music recorded on a compact disc (CD) and/or information such as data recorded on a compact disc read only memory (CD-ROM) for the present invention comprises the steps of storing the TOC information loaded in the CD-ROM in a storage means for storing information stored in a disc while the CD-ROM is being loaded into the apparatus, and invalidating the TOC information stored in the storage means and changing the storage means over to a CD-ROM data decoder while the loaded CD-ROM is being played back.

2

The storage means in this optical disc playback method may also be a random access memory (RAM).

DETAILED DESCRIPTION OF THE PREFERRED EMBODIMENTS

Embodiment

The following is a detailed description with reference to the diagrams of a first embodiment of the present invention.

Although in the following description of a first embodiment this invention has been specifically applied to one example so that various limitations have been attached, the scope of the present invention is by no means limited to this embodiment.

Figure 1:
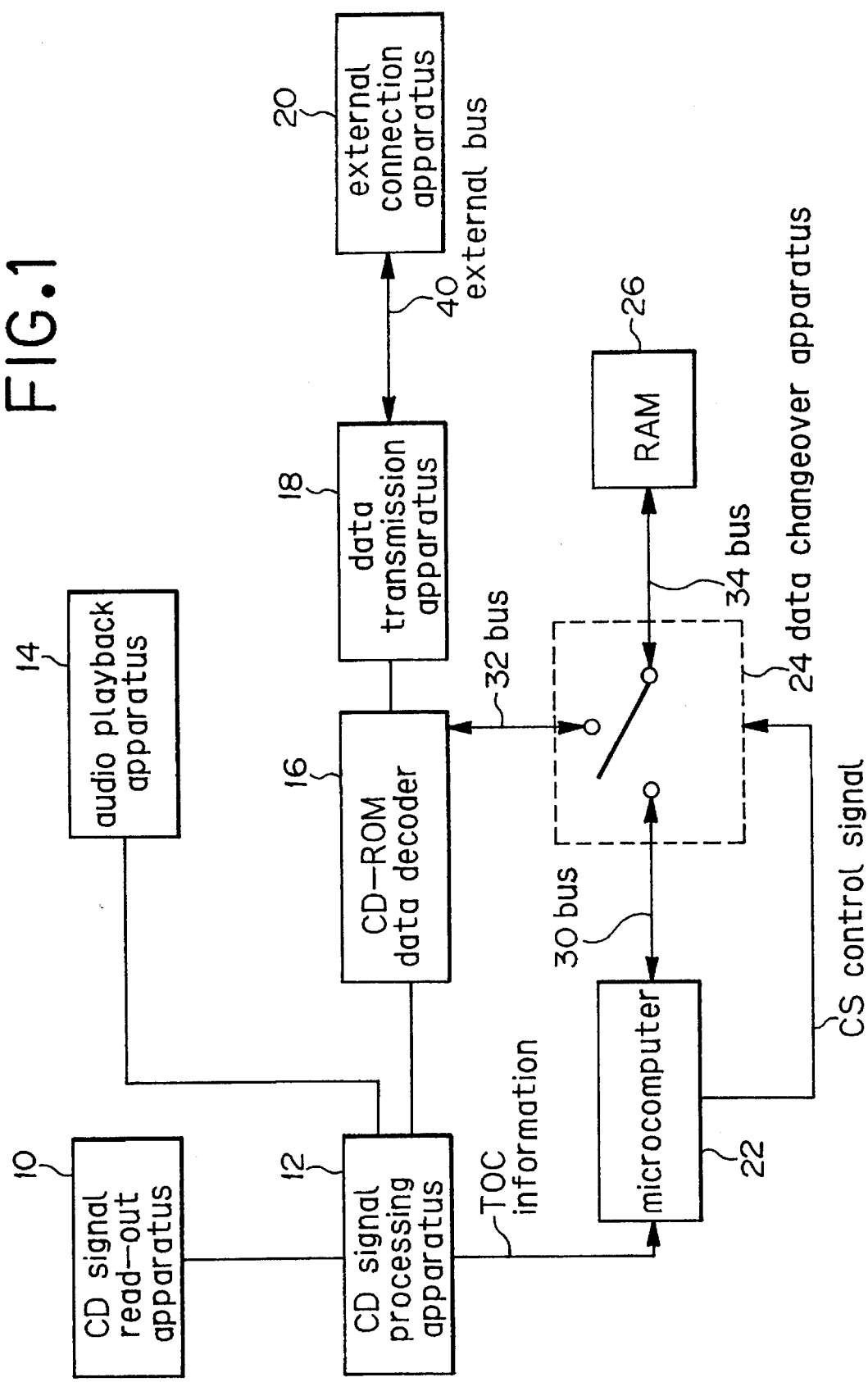
FIG. 1 is a view of a circuit diagram for the optical disc playback apparatus in a first embodiment of the present invention.

FIG. 1 is a view of the optical disc playback apparatus for a first embodiment of this invention.

This optical disc playback apparatus has a CD signal read-out apparatus 10, a CD signal processor 12, an audio playback apparatus 14, a CD-ROM data decoder 16, a data transmission apparatus 18, an external connection apparatus 20, a microcomputer 22, a data changeover apparatus 24 and a RAM 26.

The CD-signal read-out apparatus 10 has apparatus for reading the signal from an optical disc such as a compact disc and for reading the data signal from a CD-ROM and includes optical read out apparatus and servo drive apparatus. This CD-signal read-out apparatus 10 is connected to the CD signal processor 12, which is in turn connected to the audio playback apparatus 14 and the CD-ROM data decoder 16. The audio playback apparatus 14 plays back the CD signal as audio.

The CD-ROM data decoder 16 is connected to the data transmission apparatus 18, and the external connection apparatus 20 is for connecting apparatus such as external computers. This external connection apparatus 20 is connected to the data transmission apparatus 18 via the external bus 40.

The CD signal processing apparatus 12 is connected to the microcomputer 22, to which it transmits TOC information. This TOC information is, for example, the contents recorded on the lead in at the innermost periphery of a music CD or CD-ROM. The microcomputer 22 recognizes this TOC information by reading it through the CD signal processing apparatus 12. The microcomputer 22 then quickly searches for the desired position as it is instructed to do so by the TOC information which tells it, for example, at what address to start the playback from, and the optical pick up for the CD signal read-out apparatus can then be moved.

The data changeover apparatus 24 switches over between connecting a bus 30 from the microcomputer 22 and a bus 32 from the CD-ROM data decoder to a bus 34, and this bus 34 then goes on to the RAM 26. The switching over operation of this data changeover apparatus 24 is executed by the sending of a control signal CS from the microcomputer 22.

Next, a description will be given of the operation of the optical disc playback apparatus having the above construction.

The data changeover apparatus 24 is changed over to the bus 30 by a control signal CS from the microcomputer 22. In this way, the microcomputer 22 can read the TOC information for the CD from the CD signal processing apparatus 12 and write it into the RAM 26. Alternatively, the microcomputer 22 may read the TOC information already stored in the RAM 26.

On the other hand, when the data for the CD-ROM is being decoded, the data changeover apparatus 24 is changed over to the bus 32, and the RAM 26 is used as the work RAM for the CD-ROM data decoder 16.

As the RAM 26 for this embodiment of the present invention has two roles, it is therefore necessary to determine whether the TOC information is valid or not while the TOC information is being read from the RAM 26.

Figure 2:
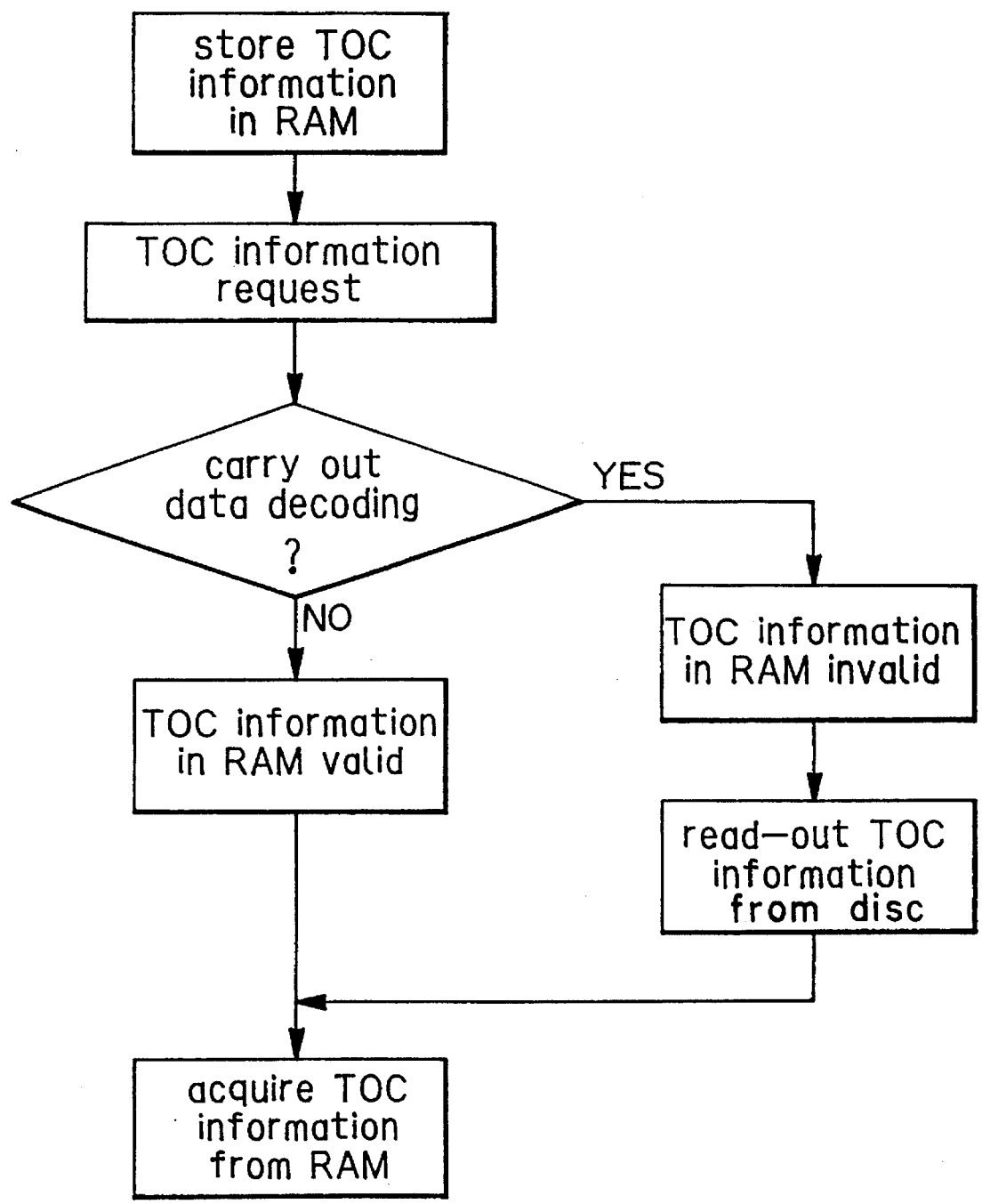
FIG. 2 is a flowchart of the process for identifying the TOC information for the embodiment of this invention in FIG. 1.

The flowchart of this determination process in FIG. 2 will therefore be referred to.

In this embodiment of the present invention, the RAM 26 is used to store the TOC information for a music CD.

First, the TOC information is read out and written into the RAM 26 while the disc (music CD or CD-ROM) is playing. After this, it is checked whether or not to carry out data decoding on the CD-ROM when necessary TOC information is encountered.

The decoding of the CD-ROM is then carried out if CD-ROM data is found in the data read out by the CD signal read out apparatus 10. Since the RAM 26 is used as the work RAM for the CD-ROM decoder 16 while the CD-ROM data decoding is being carried out, the TOC information stored in the RAM 26 is invalid. This TOC information is therefore acquired by re-reading it from the disc (CD-ROM).

On the other hand, when CD-ROM data is not found in the data read out by the CD signal read out apparatus 10, CD-ROM data decoding is not carried out, and the RAM 26 is not used as the work RAM for the CD-ROM decoder 16. The TOC information in the RAM 26 is therefore determined as being valid, and the microcomputer 22 acquires this TOC information from the RAM 26.

What is claimed is:

1. An optical disc playback apparatus for playing back information such as music recorded on a compact disc (CD) and/or information such as data recorded on compact disc read only memory (CD-ROM) comprising:

means for reading the information from the CD or the CD-ROM;

means for decoding the CD-ROM data from said reading means;

means for processing TOC information from said reading means;

storing means for storing CD TOC information when the CD is played back, and, alternatively, for storing data to be used for decoding the information recorded on the CD-ROM when the CD-ROM is played back; and means for changing over between using said storing means for storing the TOC information or using said storing means as a data decoder for the CD-ROM.

2. An optical disc playback apparatus according to claim 1, wherein said storing means is a random access memory (RAM).

3. An optical disc playback method for playing back information such as music recorded on a compact disc (CD) and/or information such as data recorded on a compact disc read only memory (CD-ROM) comprising the steps of:

storing TOC information recorded on the CD-ROM in a storage means when the CD-ROM is first loaded into the apparatus; and detecting from data read from the disc whether the disc is a CD or a CD-ROM and, if the disc is a CD-ROM, ignoring the TOC information stored in said storage means and connecting the storage means from a microcomputer controller over to a CD-ROM data decoder supplied with data read from the disc while the loaded CD-ROM is being played back and storing decoded CD-ROM data in the storage means.

4. An optical disc playback method according to claim 3, wherein the step of storing the TOC information or the decoded CD-ROM data comprises storing such TOC information or decoded CD-ROM data in a random access memory (RAM).

5. An optical disc playback apparatus for playing back information from a disc, such as music recorded on a compact disc (CD) or information such as data recorded on a compact disc read only memory (CD-ROM), comprising:

reading means for reading the information from the disc;

data decoding means for decoding CD-ROM data from the reading means;

a microcomputer connected to the data decoding means and the reading means for processing TOC information from the reading means and for detecting from the information read by the reading means whether the disc is a CD or a CD-ROM;

memory means connected to the microcomputer for initially storing the TOC information when the CD is played back, and, alternatively, connected to the data decoding means for storing data to be used for decoding the information recorded on the CD-ROM when the CD-ROM is played back; and switching means controlled by the microcomputer for alternatively connecting the memory means to the microcomputer, for storing the TOC information, or to the data decoding means for storing decoded CD-ROM data.

6. An optical disc playback apparatus according to claim 5, wherein the memory means is a random access memory (RAM).

7. An optical disc playback method for playing back information from a disc, such as music recorded on a compact disc (CD) or information such as data recorded on a compact disc read only memory (CD-ROM), comprising the steps of:

initially reproducing TOC information recorded on the disc and storing the TOC information in a storage means when the disc is first loaded into the apparatus; and detecting from data read from the disc whether the disc is a CD or a CD-ROM and, if the disc is a CD-ROM, disregarding the TOC information stored in the storage means and connecting the storage means from a microcomputer controller over to a CD-ROM data decoder supplied with data read from the disc, while the loaded CD-ROM is being played back, and storing decoded CD-ROM data from the CD-ROM data decoder in the storage means.

8. An optical disc playback method according to claim 7, further comprising the step of reading the TOC information from the storage means when it is detected that the disc is a CD.

9. An optical disc playback method according to claim 7, further comprising the step of reading TOC information from the disc, rather than from the storage means, after it is detected that the disc is a CD-ROM.

* * * * *